US009623484B2

(12) United States Patent
Pierce et al.

(10) Patent No.: US 9,623,484 B2
(45) Date of Patent: Apr. 18, 2017

(54) PIPE MACHINING APPARATUSES AND METHODS OF OPERATING THE SAME

(71) Applicant: Illinois Tool Works Inc., Glenview, IL (US)

(72) Inventors: Kenneth R. Pierce, Arlington Heights, IL (US); Farhat A. Khan, Glendale Heights, IL (US); William M. Pence, Crystal Lake, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 732 days.

(21) Appl. No.: 13/795,187

(22) Filed: Mar. 12, 2013

(65) Prior Publication Data

US 2014/0196582 A1    Jul. 17, 2014

Related U.S. Application Data

(60) Provisional application No. 61/752,163, filed on Jan. 14, 2013.

(51) Int. Cl.
*B23B 3/22* (2006.01)
*B23Q 1/25* (2006.01)
*B23B 5/08* (2006.01)
*B23D 21/04* (2006.01)
(Continued)

(52) U.S. Cl.
CPC ............ *B23B 5/08* (2013.01); *B23B 3/26* (2013.01); *B23B 5/161* (2013.01); *B23B 5/163* (2013.01); *B23D 21/04* (2013.01); *Y10T 82/16016* (2015.01); *Y10T 82/16951* (2015.01)

(58) Field of Classification Search
CPC ... Y10T 82/10; Y10T 82/22; Y10T 82/16951; B23B 3/265; B23B 5/16; B23B 3/22; B23B 5/162; B23B 3/26; B23B 5/161
USPC ... 82/1.2, 1.4, 113, 128, 131, 130, 136, 153; 408/79; 409/179
See application file for complete search history.

(56) References Cited

U.S. PATENT DOCUMENTS

| 1,140,208 A | 5/1915 | Taylor |
| 1,225,209 A | 5/1917 | Beaulieu |

(Continued)

FOREIGN PATENT DOCUMENTS

| CN | 2475496 Y | 2/2002 |
| CN | 1562545 A | 1/2005 |

(Continued)

OTHER PUBLICATIONS

International Search Report and Written Opinion for PCT/US2013/077802 dated May 27, 2014, 11 pages.

(Continued)

*Primary Examiner* — Sara Addisu
(74) *Attorney, Agent, or Firm* — Klintworth & Rozenblat IP LLC

(57) ABSTRACT

Pipe machining apparatuses are provided. In one aspect, a pipe machining apparatus includes a tool support adapted to both part or completely cut a pipe into multiple portions, and machine a groove in an exterior surface of the pipe. In another aspect, the apparatus has a low radial clearance such that the tool support does not project a significant distance beyond a pipe. In a further aspect, a method of parting and machining a groove in a pipe with a single pipe machining apparatus is provided.

9 Claims, 11 Drawing Sheets

(51) Int. Cl.
  *B23B 3/26*    (2006.01)
  *B23B 5/16*    (2006.01)

(56) References Cited

U.S. PATENT DOCUMENTS

| | | | | |
|---|---|---|---|---|
| 1,323,092 A * | 11/1919 | Palmer | ............ | B23B 29/04 |
| | | | | 82/158 |
| 2,275,327 A * | 3/1942 | Severson | ............ | B23B 29/248 |
| | | | | 407/108 |
| 2,358,741 A | 9/1944 | Shelby | | |
| 2,842,238 A * | 7/1958 | Shaw | ............ | B23D 21/04 |
| | | | | 30/101 |
| 3,078,547 A * | 2/1963 | Sweet | ............ | B23B 29/248 |
| | | | | 407/68 |
| 3,371,567 A * | 3/1968 | Davis | ............ | B23B 29/24 |
| | | | | 407/108 |
| 3,455,002 A * | 7/1969 | Miller | ............ | B23B 29/248 |
| | | | | 407/113 |
| 3,732,618 A | 5/1973 | Lorenz | | |
| 3,732,758 A | 5/1973 | Rinaldo | | |
| 3,807,047 A * | 4/1974 | Sherer | ............ | B23D 21/02 |
| | | | | 30/101 |
| 3,893,356 A * | 7/1975 | Atzberger | ............ | B23B 29/26 |
| | | | | 82/112 |
| 3,908,491 A * | 9/1975 | Gilmore | ............ | B23B 3/265 |
| | | | | 82/113 |
| 4,104,937 A * | 8/1978 | Breaux | ............ | B08B 9/021 |
| | | | | 15/104.04 |
| 4,111,083 A * | 9/1978 | Carter | ............ | B23B 29/26 |
| | | | | 407/88 |
| 4,114,484 A * | 9/1978 | Feamster, III | ............ | B23B 5/162 |
| | | | | 144/205 |
| 4,211,510 A | 7/1980 | Hopkins | | |
| 4,217,061 A | 8/1980 | Eiland | | |
| 4,318,391 A | 3/1982 | Wachs et al. | | |
| 4,391,458 A * | 7/1983 | Blakeley | ............ | F16L 41/12 |
| | | | | 285/112 |
| 4,402,136 A * | 9/1983 | Rast | ............ | B23D 21/08 |
| | | | | 30/101 |
| 4,421,441 A | 12/1983 | Hirose | | |
| 4,483,223 A | 11/1984 | Nall et al. | | |
| 4,490,909 A | 1/1985 | Wachs et al. | | |
| 4,543,861 A | 10/1985 | Kwech et al. | | |
| 4,637,285 A | 1/1987 | Mizoguchi | | |
| 4,640,159 A * | 2/1987 | Stojanovski | ............ | B23B 27/00 |
| | | | | 74/826 |
| 4,655,108 A | 4/1987 | Galos | | |
| 4,677,884 A | 7/1987 | Kwech et al. | | |
| 4,739,685 A | 4/1988 | Ricci | | |
| 4,750,392 A * | 6/1988 | Hong | ............ | B23B 29/04 |
| | | | | 407/75 |
| 4,762,038 A * | 8/1988 | Olson | ............ | B23D 21/04 |
| | | | | 30/97 |
| 4,770,074 A | 9/1988 | Kwech | | |
| 4,791,842 A | 12/1988 | Olson | | |
| 4,825,543 A * | 5/1989 | Thalmann | ............ | B23B 5/168 |
| | | | | 30/90.1 |
| 4,880,340 A | 11/1989 | Taki et al. | | |
| 4,936,718 A * | 6/1990 | Proffitt | ............ | B23C 5/22 |
| | | | | 407/36 |
| 4,939,964 A | 7/1990 | Ricci | | |
| 4,944,205 A | 7/1990 | Ricci | | |
| 5,002,440 A | 3/1991 | Tamaoki et al. | | |
| 5,050,291 A | 9/1991 | Gilmore | | |
| 5,054,342 A | 10/1991 | Swiatowy et al. | | |
| 5,063,799 A | 11/1991 | Brewer | | |
| 5,096,327 A | 3/1992 | Ruland | | |
| 5,119,703 A * | 6/1992 | Ruby | ............ | B23B 29/24 |
| | | | | 407/68 |
| 5,199,928 A | 4/1993 | Gress et al. | | |
| 5,211,212 A * | 5/1993 | Carlson | ............ | A01G 23/091 |
| | | | | 144/241 |
| 5,368,399 A | 11/1994 | Tremblay | | |
| 5,394,776 A * | 3/1995 | Robinson | ............ | B23B 41/00 |
| | | | | 30/95 |
| 5,429,021 A | 7/1995 | Astle et al. | | |
| 5,549,024 A * | 8/1996 | Ricci | ............ | B23B 5/16 |
| | | | | 82/101 |
| 5,557,995 A * | 9/1996 | Robinson | ............ | B23B 41/00 |
| | | | | 407/103 |
| 5,660,093 A * | 8/1997 | Ricci | ............ | B23B 5/00 |
| | | | | 82/113 |
| 5,775,188 A | 7/1998 | Strait | | |
| 5,778,746 A * | 7/1998 | Keller | ............ | B23B 5/02 |
| | | | | 407/68 |
| 5,894,772 A * | 4/1999 | Nodar | ............ | B23B 5/162 |
| | | | | 82/113 |
| 5,954,462 A | 9/1999 | Way et al. | | |
| 6,038,947 A * | 3/2000 | Tremblay | ............ | B23B 3/26 |
| | | | | 82/113 |
| 6,854,367 B2 | 2/2005 | Ericksson | | |
| 6,880,832 B2 | 4/2005 | DeRosa | | |
| 6,966,731 B2 | 11/2005 | VanderPol et al. | | |
| 7,140,812 B2 * | 11/2006 | Bryan | ............ | B29C 59/022 |
| | | | | 29/557 |
| 7,267,035 B2 * | 9/2007 | Uebelhart | ............ | B23B 29/323 |
| | | | | 29/54 |
| 7,270,505 B2 | 9/2007 | VanderPol et al. | | |
| 7,337,698 B2 * | 3/2008 | DiBiase | ............ | B23B 5/12 |
| | | | | 82/113 |
| 7,510,462 B2 * | 3/2009 | Bryan | ............ | B23B 5/00 |
| | | | | 125/13.01 |
| 7,757,591 B2 * | 7/2010 | Trice | ............ | B23B 27/04 |
| | | | | 407/113 |
| 7,992,473 B2 * | 8/2011 | Marple | ............ | B23D 21/02 |
| | | | | 82/113 |
| 8,051,753 B2 * | 11/2011 | Ricci | ............ | B23B 5/38 |
| | | | | 82/113 |
| 8,186,249 B2 * | 5/2012 | Sasu | ............ | B23B 3/06 |
| | | | | 82/1.11 |
| 8,250,953 B2 * | 8/2012 | Hall | ............ | B23B 3/26 |
| | | | | 82/113 |
| 8,667,693 B2 * | 3/2014 | Ellis | ............ | B23D 45/12 |
| | | | | 30/102 |
| 2003/0106397 A1 * | 6/2003 | Ricci | ............ | B23B 3/265 |
| | | | | 82/113 |
| 2004/0035171 A1 | 2/2004 | Gormany | | |
| 2004/0234352 A1 | 11/2004 | Vanderpol | | |
| 2005/0132851 A1 | 6/2005 | Place | | |
| 2005/0155471 A1 * | 7/2005 | Ricci | ............ | B23B 3/265 |
| | | | | 82/123 |
| 2006/0092674 A1 | 5/2006 | Belton | | |
| 2006/0207395 A1 | 9/2006 | Place | | |
| 2007/0289422 A1 * | 12/2007 | Place | ............ | B23B 5/162 |
| | | | | 82/113 |
| 2010/0162860 A1 | 7/2010 | Hall et al. | | |
| 2011/0041658 A1 * | 2/2011 | Weinberg | ............ | B23B 5/162 |
| | | | | 82/113 |
| 2011/0083537 A1 * | 4/2011 | Place | ............ | B23B 3/265 |
| | | | | 82/1.11 |
| 2011/0219920 A1 * | 9/2011 | Arnemann | ............ | B23B 3/26 |
| | | | | 82/113 |
| 2013/0239762 A1 * | 9/2013 | Place | ............ | B23B 3/26 |
| | | | | 82/113 |
| 2014/0096655 A1 * | 4/2014 | Coakley | ............ | B23B 5/08 |
| | | | | 82/72 |
| 2014/0096662 A1 | 4/2014 | Coakley | | |
| 2014/0190322 A1 * | 7/2014 | Pierce | ............ | B23D 21/04 |
| | | | | 82/70.2 |
| 2015/0107425 A1 * | 4/2015 | Walton | ............ | B23B 3/26 |
| | | | | 82/113 |

FOREIGN PATENT DOCUMENTS

| | | |
|---|---|---|
| CN | 2761329 Y | 3/2006 |
| CN | 201008978 Y | 1/2008 |
| CN | 101384393 A | 3/2009 |
| DE | 2439852 A | 4/1976 |
| DE | 10 2007 013503 A1 | 9/2008 |

(56) References Cited

FOREIGN PATENT DOCUMENTS

| DE | 10 2008 025716 A1 | 12/2009 |
|---|---|---|
| FR | 2 641 487 A1 | 7/1990 |
| NL | 1 038 144 C | 1/2012 |
| WO | 2012/071419 A1 | 5/2012 |
| WO | 2014/109910 A1 | 7/2014 |

OTHER PUBLICATIONS

International Search Report and Written Opinion for PCT/US2014/058814 dated Dec. 15, 2014, 9 pages.
International Search Report and Written Opinion for PCT/US2016/020481 dated Jun. 13, 2016, 13 pages.

\* cited by examiner

PIPE MACHINING APPARATUSES AND METHODS OF OPERATING THE SAME

RELATED APPLICATIONS

The present application claims the benefit of U.S. Provisional Patent Application No. 61/752,163, filed Jan. 14, 2013, the entire contents of which is incorporated herein by reference.

FIELD OF THE INVENTION

The present disclosure generally relates to pipe machining apparatuses and, more particularly, to split frame pipe machining apparatuses for machining pipes.

BACKGROUND

A variety of different types of pipe machining apparatuses exist to perform various machining processes on pipes. Two such processes include parting pipes and cutting grooves in pipes. Parting pipes includes cutting completely through a pipe to separate the pipe into multiple portions. Cutting a groove in a pipe includes cutting a groove part of the way through a thickness of a pipe a distance from an end of the pipe. Two different pipe machining apparatuses are required to perform these two processes. That is, one apparatus parts a pipe and a second apparatus cuts a groove in the pipe a distance away from an end of the pipe.

Moreover, pipe machining apparatuses that are used to cut grooves in pipes commonly project a significant distance outwardly from an outer diameter of a pipe, thereby limiting use of such pipe machining apparatuses in environments with low clearance between the outer diameter of the pipe and adjacent objects (e.g., other pipes, walls, etc.).

SUMMARY

In one aspect, an apparatus for machining a pipe is provided.

In another aspect, an apparatus for machining a pipe is provided and includes a tool support adapted to support a parting tool and a groove tool.

In a further aspect, an apparatus for machining a pipe is provided and includes a low radial clearance.

In yet another aspect, a tool support for a pipe machining apparatus is provided and includes a base, an advancement member adapted to rotate, and an advancement shaft coupled to the advancement member and adapted to rotate with the advancement member. The advancement shaft includes a threaded portion. The tool support also includes a roller housing threadably coupled to the advancement shaft and moveable along the advancement shaft as the advancement shaft rotates, and a tool housing coupled to and moveable with the roller housing. The tool housing is adapted to support a parting tool and a groove tool. The tool support further includes a roller adapted to engage an exterior surface of a pipe, and a stop member engageable by the roller housing and adapted to stop movement of the roller housing in at least one direction.

The tool support may further include a roller support member to which the roller is coupled. The roller support member and the roller may be moveable relative to the base, the roller housing, and the tool housing.

The tool support may additionally include a threaded fastener coupled to the roller support member such that rotation of the threaded fastener moves the roller support member.

The groove tool of the tool support may be one of a plurality of groove tools and the plurality of groove tools are adapted to machine a plurality of differently configured grooves in a pipe.

The parting tool may be the only parting tool of the tool support, and the parting tool may be used in combination with any of the plurality of groove tools.

In yet a further aspect, a pipe machining apparatus is provided and includes a frame, a tool carrier coupled to and adapted to move relative to the frame, and a tool support coupled to and moveable with the tool carrier relative to the frame. The tool support is adapted to support a parting tool and a groove tool, and the parting tool is adapted to part a pipe and the groove tool is adapted to machine a groove into the pipe.

In still another aspect, a method of machining a pipe with a pipe machining apparatus is provided. The method includes coupling a frame of the pipe machining apparatus to a pipe, rotating a tool carrier and a tool support coupled to the tool carrier relative to the frame, engaging an advancement mechanism of the pipe machining apparatus with an advancement member of the tool support, and moving a parting tool and a groove tool toward the pipe as a result of engaging the advancement mechanism with the advancement member. The parting tool and the groove tool are supported by the tool support.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
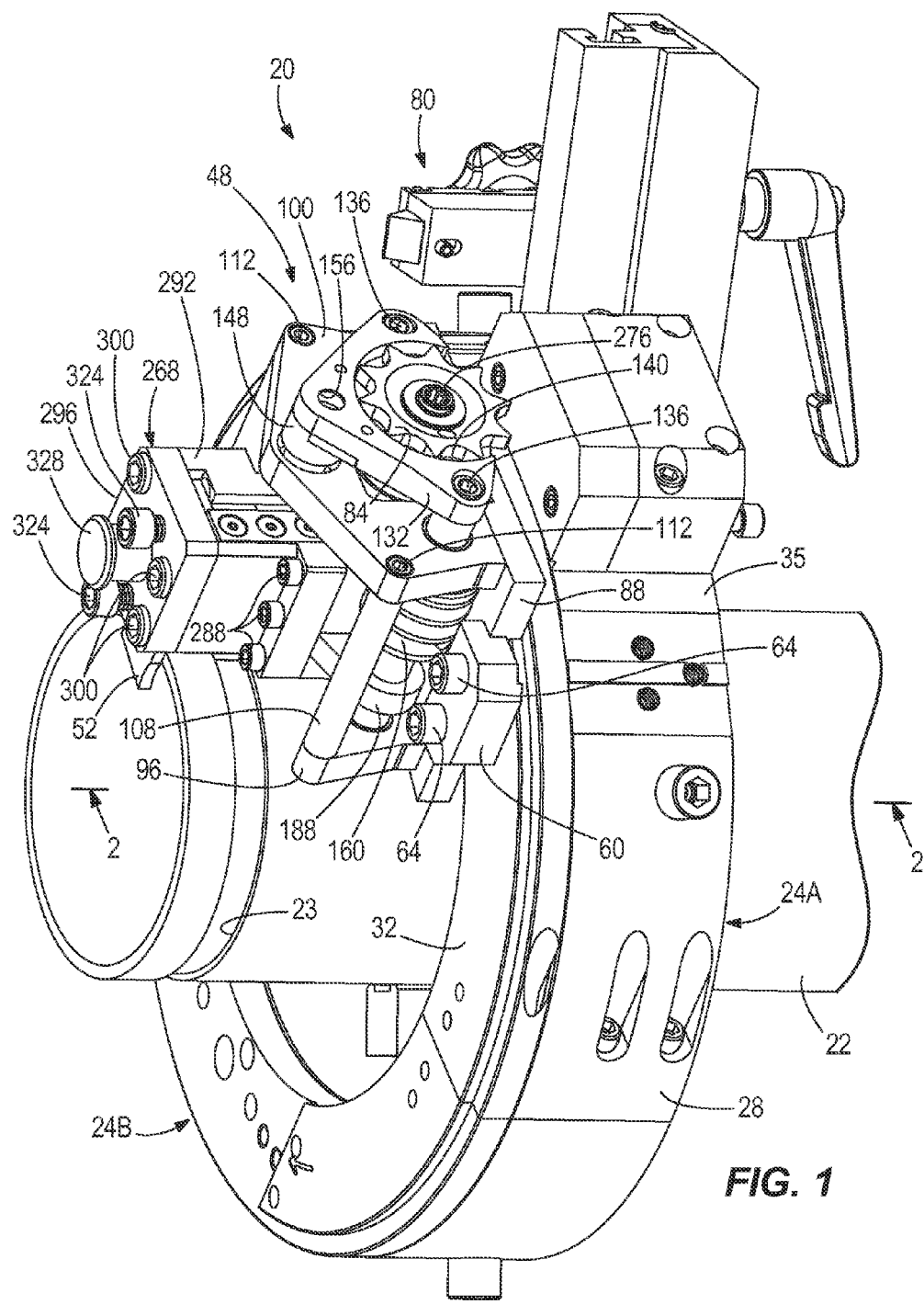
FIG. 1 is an isometric view of an exemplary pipe machining apparatus coupled to an exemplary pipe, in accordance with one embodiment.
Figure 2:
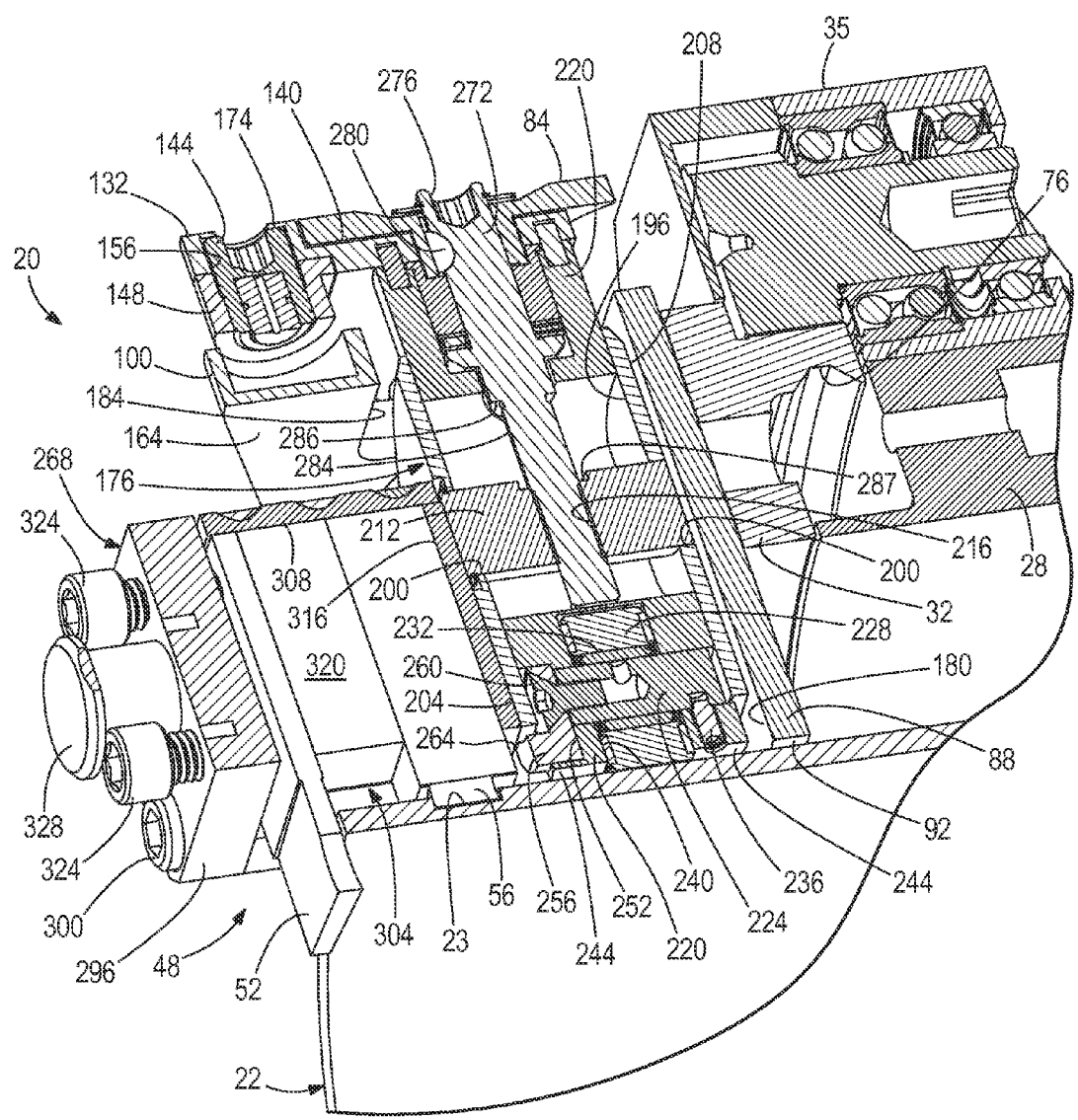
FIG. 2 is a cross-sectional view of the pipe machining apparatus and the pipe taken along line 2-2 in FIG. 1, in accordance with one embodiment.

With reference to FIGS. 1 and 2, an exemplary embodiment of a pipe machining apparatus 20 adapted to machine pipes of varying diameters is illustrated. An exemplary pipe 22 is illustrated in FIGS. 1 and 2. It should be understood that the apparatus 20 is adapted to machine pipes of varying diameters. In some exemplary embodiments, the apparatus 20 is adapted to machine pipes between about six inches and about fourteen inches. In other exemplary embodiments, the apparatus 20 is adapted to machine pipes between about three inches and about thirty inches. The apparatus 20 is adapted to part or completely cut through a pipe 22 and machine a groove or recess 23 into an outer surface of the pipe 22. By parting the pipe 22 and machining a groove 23 in the pipe 22 with the apparatus 20, the apparatus 20 is preparing the pipe 22 to be coupled to another pipe via a coupling member 25.

Figure 3:
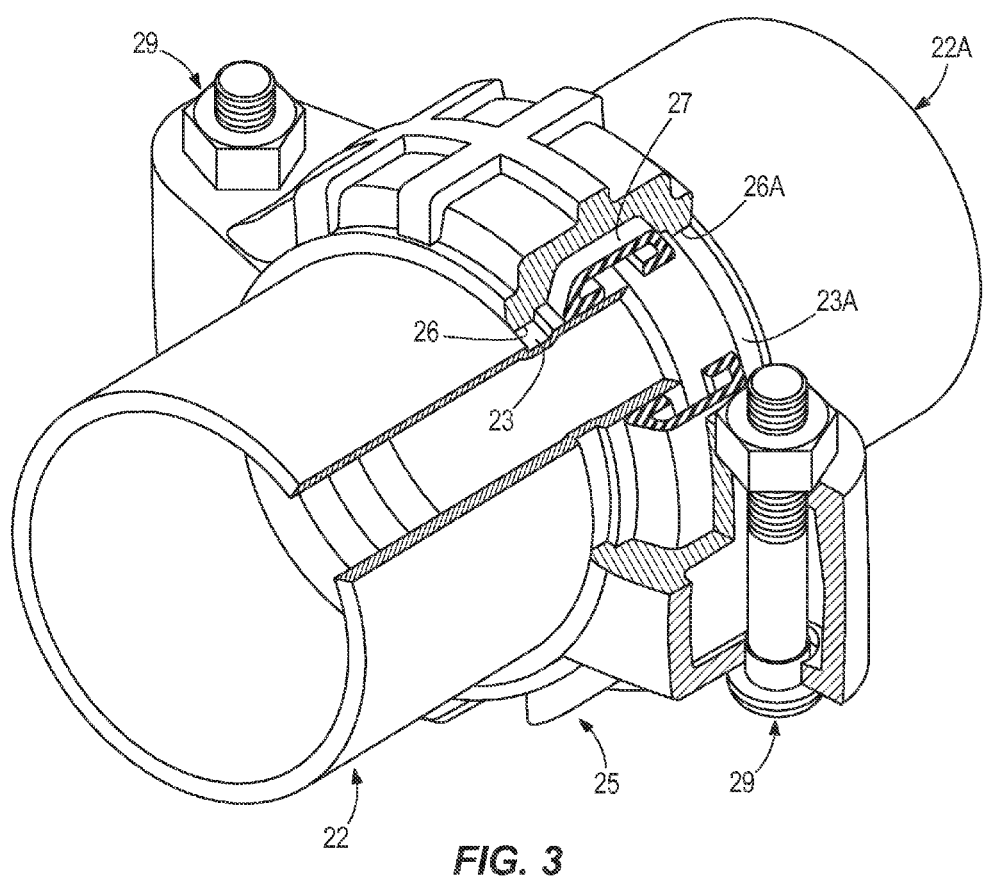
FIG. 3 is an isometric view of a pair of exemplary pipes and an exemplary coupling mechanism coupling the two pipes together, in accordance with one embodiment.

An exemplary coupling member 25 is illustrated in FIG. 3. In the illustrated exemplary embodiment, two pipes 22, 22A are illustrated, each with a groove 23, 23A defined near an end thereof adapted to receive a projection 26, 26A of the coupling member 25. The coupling member 25 also includes a gasket or sealing member 27 covering abutting ends of the two pipes 22, 22A and an opening or gap that may exist between the two pipes 22, 22A. One or more fastening member(s) 29 is/are tightened to compress the coupling member 25 and sealing member 27 around the two pipes 22, 22A and seal the opening between the two pipes 22, 22A. Positioning and dimensioning of the grooves 23, 23A defined in the two pipes 22, 22A is important to ensure the coupling member 25 is capable of properly coupling to the two pipes 22, 22A and properly sealing the opening between the two pipes 22, 22A. Moreover, a distance of the groove 23 from an end of the pipe 22, a width of the groove 23, and a depth of the groove 23 are all important characteristics of the groove 23.

Returning now to FIGS. 1 and 2, the apparatus 20 is formed of two joined-together sections 24A, 24B and includes a frame 28 and a tool carrier 32. A drive mechanism is coupled to a periphery 35 of the frame 28 and includes one or more pinion gears respectively coupled with one or more suitable drive motors, such as an air motor with suitable gear reduction means. The frame 28 is adapted to couple and be fixed relative to a pipe 22, and the tool carrier 32 is rotatable relative to the fixed frame 28 and the pipe 22. The motors are adapted to rotate the tool carrier 32 relative to the frame 28 through a gear train. The tool carrier 32 has a circular gear rack for meshing with the one or more pinion gears coupled to the one or more motors. Therefore, it can be seen that the one or more drive motors are adapted to rotate tool carrier 32 relative to the frame 28 through a gear train provided by the one or more pinion gears and the circular gear rack on the tool carrier 32.

The rotatable tool carrier 32 includes a tool support 48, which supports a parting tool 52 for parting or completely cutting the pipe 22 and a groove tool 56 for cutting or machining a groove or recess 23 into the pipe 22 as the tools 52, 56 rotate circumferentially about the pipe 22. The tool support 48 is coupled to the tool carrier 32 by a plurality of clamps 60 and fasteners 64.

The apparatus 20 further includes a plurality of coupling members engageable with an exterior of the pipe 22 and having suitable adjustability to couple and concentrically or axially locate the apparatus 20 to the exterior of the pipe 22.

Tool carrier 32 is rotatably mounted on and supported by frame 28 by a plurality of roller bearings. The roller bearings ride in a circular bearing race 76 (see FIG. 2) on the interior of tool carrier 32.

The apparatus 20 also includes an advancement mechanism 80 that is adjustable into and out of a path of an advancement member 84 coupled to the tool support 48 to advance the tools 52, 56 toward the pipe 22.

With continued reference to FIGS. 1 and 2 and further reference to FIGS. 4-8, the tool support 48 includes a base 88 selectively coupled to the tool carrier 32 with the clamps 60 and fasteners 64. The base 88 includes an inner surface 92 having an arcuate shape to accommodate and complement an arcuate exterior surface of a pipe 22. The tool support 48 also includes a pair of inner support members 96 and an outer support member 100 spaced-apart from each other and all coupled to the base 88 with respective fasteners 104. A pair of support rods 108 are coupled, with fasteners 112, to and between the inner support members 96 and the outer support member 100. Inner support members 96 also define apertures 116 therein and the outer support member 100 defines apertures 120 therein axially aligned with the apertures 116 defined in the inner support members 96. The apertures 116, 120 defined in the inner support members 96 and the outer support member 100 are adapted to receive guide members 124 and allow movement between the guide members 124 and the inner and outer support members 96, 100. Bushings or other low friction members 128 are disposed in the apertures 116, 120 to facilitate sliding movement of the guide members 124 relative to one or more of the inner and outer support members 96, 100.

Outer ends of the guide members 124 are coupled to a plate 132 having a generally triangular shape with fasteners 136. The advancement member 84 is partially positioned within a cavity 140 defined in an outer surface of the plate 132 and is rotatable relative to the plate 132 within the cavity 140. A threaded fastener 144 is threadably coupled to a threaded member 148 coupled to the plate 132 with fasteners 152. An end of the threaded fastener 144 abuts a surface defined in an outer surface of the outer support member 100. An access aperture 156 defined in the plate 132 aligned with the threaded fastener 144 allows access to the threaded fastener 144 with a tool in order to facilitate rotation of the threaded fastener 144. The access aperture 156 also includes a lip or reduced diameter portion 174 that acts as a stop or limiting surface to the threaded fastener 144 to limit the outward travel of the threaded fastener 144.

The tool support 48 also includes a pair of biasing members 160 (e.g., a pair of coil springs in the illustrated exemplary embodiment) with one guide member 124 extending through each coil spring 160. Each biasing member 160 is compressed between an inner surface 164 of the outer support member 100 and a washer 168 coupled to the guide member 124 with a retaining member 172.

With continued reference to FIGS. 1, 2, and 4-8, the tool support 48 further includes a roller housing 176 positioned in and moveable within a recess 180 defined in the base 88. A roller housing aperture 184 is defined in the outer support member 100 to allow the roller housing 176 to move inward and outward relative to the outer support member 100 without interfering with the outer support member 100. The roller housing 176 includes a pair of flanges 188 with each flange 188 defining a flange aperture 192 therein. The guide members 124 are received in respective flange apertures 192 and the guide members 124 guide the roller housing 176 as it moves inward and outward. The roller housing 176 also defines an internal cavity 196 therein extending completely through the roller housing 176 from an inner side to an outer side of the roller housing 176. The roller housing 176 further defines a pair of axially aligned apertures 200, one of which is defined in a top surface 204 of the roller housing 176 and a second of which is defined in a bottom surface 208 of the roller housing 176. The axially aligned apertures 200 are adapted to support a coupling member 212 including an internally threaded bore 216.

The tool support 48 further includes a roller support member 220, a shaft 224, a roller 228, and a bearing assembly 232. The shaft 224 is fixedly coupled to the roller support member 220 with a fastener 236 and the roller support member 220 defines a roller cavity 240 therein adapted to receive the roller 228. The bearing assembly 232 is disposed between the roller 228 and the shaft 224 to enable the roller 228 to rotate about the shaft 224. An inner surface 244 of the roller support member 220 is flattened or reduced such that the roller 228 projects further inward than the roller support member 220. The roller 228 engages the pipe 22 and the flatted inner surfaces 244 of the roller support member 220 provides clearance between the roller support member 220 and the pipe 22 to prevent interference during operation. A pair of thrust bearings 248 are also provided between the roller 228 and surfaces of the roller support member 220 within the roller cavity 240.

A recess 252 is defined in an outer surface of the roller support member 220 and is adapted to receive a stop member 256. In the illustrated exemplary embodiment, the stop member 256 has a generally crescent shape. Alternatively, the stop member 256 may have any shape and be within the intended spirit and scope of the present disclosure. The stop member 256 is coupled to the shaft 224 with a fastener 260. The stop member 256 projects beyond the roller support member 220 and includes a pair of engaging surfaces 264 adapted to be engaged by the roller housing 176. The stop member 256 limits the inward travel of the roller housing 176, a tool housing 268 coupled to the roller housing 176, and tools 52, 56 supported by and coupled to the tool housing 268.

The advancement member 84 is coupled to and adapted to rotate with an advancement shaft 272. The advancement shaft 272 includes a tool engagement portion 276 at one end thereof and the advancement member 84 is coupled to the advancement shaft 272 by a key member or keyway 280. A portion of the advancement shaft 272 includes external threads 284 complementarily to the internal threads in the bore 216 of the coupling member 212. The threaded portion 284 of the advancement shaft 272 is received within the bore 216 in the coupling member 212. Rotation of the advancement member 84 causes rotation of the advancement shaft 272, which then causes the coupling member 212 and the roller housing 176 to translate inward and outward depending on the direction of rotation. Inward movement of these components is stopped or limited by the stop member 256. Outward movement of these components is stopped or limited by engagement between the coupling member 212 and a stop member 286 on the advancement shaft 272. The coupling member 212 defines a recess 287 therein for receiving and engaging the stop member 286.

The tool housing 268 is rigidly coupled to a surface of the roller housing 176 with a plurality of fasteners 288. The tool housing 268 includes a base 292 and a cap 296 coupled to the base 292 with a plurality of cap fasteners 300. The tool housing 268 also defines a tool cavity 304 adapted to receive the tools 52, 56 therein. One side of the cavity 304 is opened and an opposing side of the cavity 304 is closed by a reference surface 308. The open side of the cavity 304 faces the pipe 22, the reference surface 308 is adapted to be engaged by ends of the tools 52, 56, and the cavity 304 also includes side surfaces 312 that define the sides of the cavity 304 and a bottom surface 316 that defines a bottom of the cavity 304. The cap 296 defines a top of the cavity 304. The reference surface 308, side surfaces 312, bottom surface 316 and cap 296 are adapted to ensure proper positioning and alignment of the tools 52, 56 within the tool support 48.

In the illustrated exemplary embodiment, the groove tool 56 is positioned on the bottom surface 316, a spacer 320 is positioned on the groove tool 56, and the parting tool 52 is positioned on the spacer 320. Rear surfaces of the groove tool 56, spacer 320, and parting tool 52 engage the reference surface 308 of the tool housing 268 to ensure the groove tool 56 and the parting tool 52 are properly positioned and project inward of the tool support 48 an appropriate extent to respectively cut a groove 23 in the pipe 22 and part the pipe 22. In other exemplary embodiments, a separate spacer may not be required. In such exemplary embodiments, the groove tool 56 or the parting tool 52 may include additional material to occupy the required space between the groove tool 56 and the parting tool 52 in order to provide the necessary spacing between the groove tool 56 and the parting tool 52. Returning to the illustrated exemplary embodiment, once the tools 52, 56 are properly positioned within the cavity 304, a pair of securement fasteners 324 are tightened to engage the parting tool 52 and compress the tools 52, 56 and spacer 320 together within the cavity 304 to secure them in place for operation. Additional securement of the tools 52, 56 may be achieved by positioning a securement cap 328 over the securement fasteners 324.

The apparatus 20 is adapted to both part a pipe 22 and machine a groove 23 into an exterior of the pipe 22. Moreover, the apparatus 20 is adapted to machine a wide variety of grooves having a wide variety of shapes, sizes and distances from the parted end of the pipe 22. In some exemplary embodiments, to perform these functions, the apparatus 20 requires a single parting tool 52, a single spacer 320, and a plurality of different groove tools 56A-56E (see FIG. 9). The single parting tool 52 is used no matter the type of groove 23 that will be defined in the pipe 22. On the other hand, a plurality of different groove tools 56A-56E are required to machine a plurality of different grooves in the pipe 22. In some exemplary embodiments, one groove tool is required for each type of groove to be machined into the pipe 22. In other exemplary embodiments, one groove tool may be used to machine multiple types of grooves in a pipe.

Figure 9:
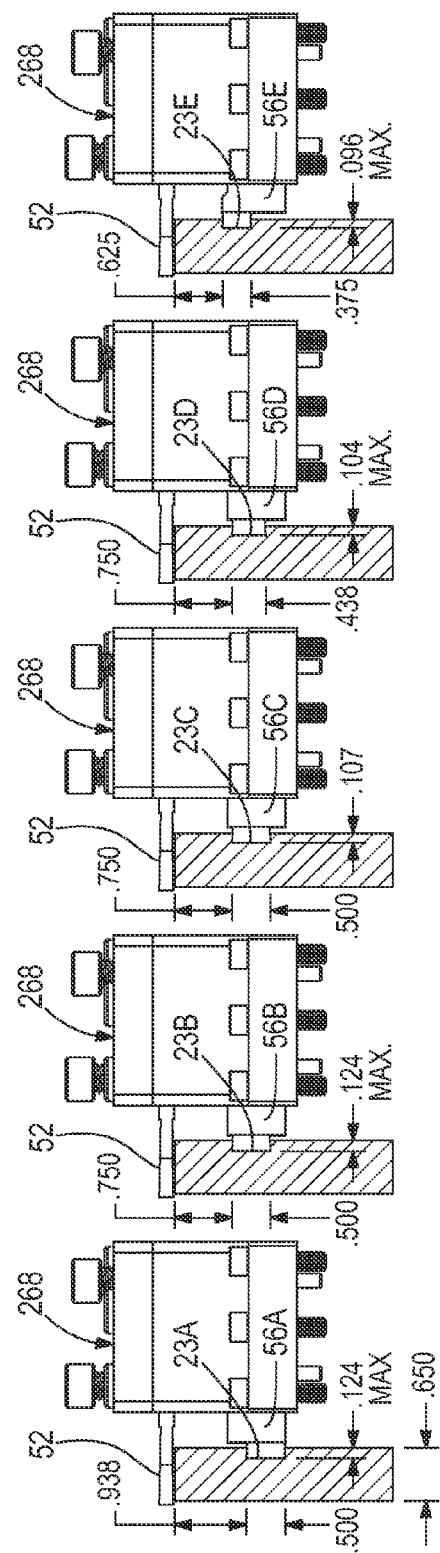
FIG. 9 is a plurality of elevational views of a plurality of exemplary tools useable with the pipe machining apparatus illustrated in FIG. 1, in accordance with one embodiment.
Figure 9:
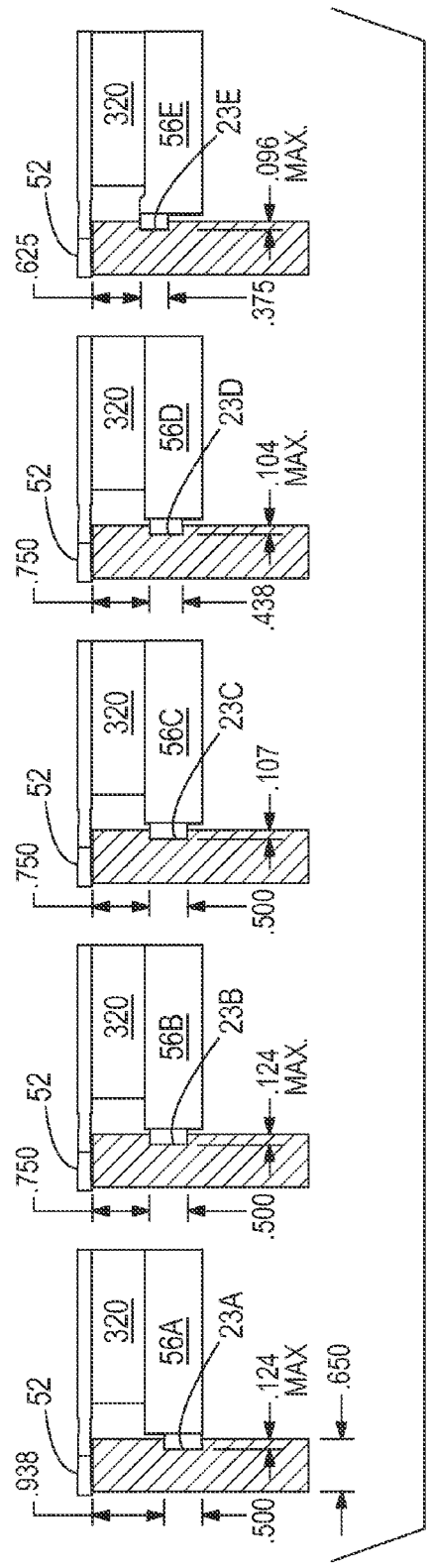

With reference to FIG. 9, a plurality of exemplary combinations of tools and spacers are illustrated. In each exemplary combination, the parting tool 52 and the spacer 320 are the same, while the groove tool is different in each combination in order to provide a groove with different characteristics (e.g., width, depth, distance from end of pipe, etc.). It should be understood that the groove tools 56A-56E included in FIG. 9 are not intended to be limiting on the present disclosure. Rather, these groove tools 56A-56E are merely exemplary groove tools of a larger variety of possible groove tools useable with the apparatus 20. Thus, the representation of these exemplary groove tools is not intended to be limiting upon the present disclosure and any other possible groove tools having any possible configurations adapted to machine grooves having any characteristics are intended to be within the spirit and scope of the present disclosure.

Figure 10:
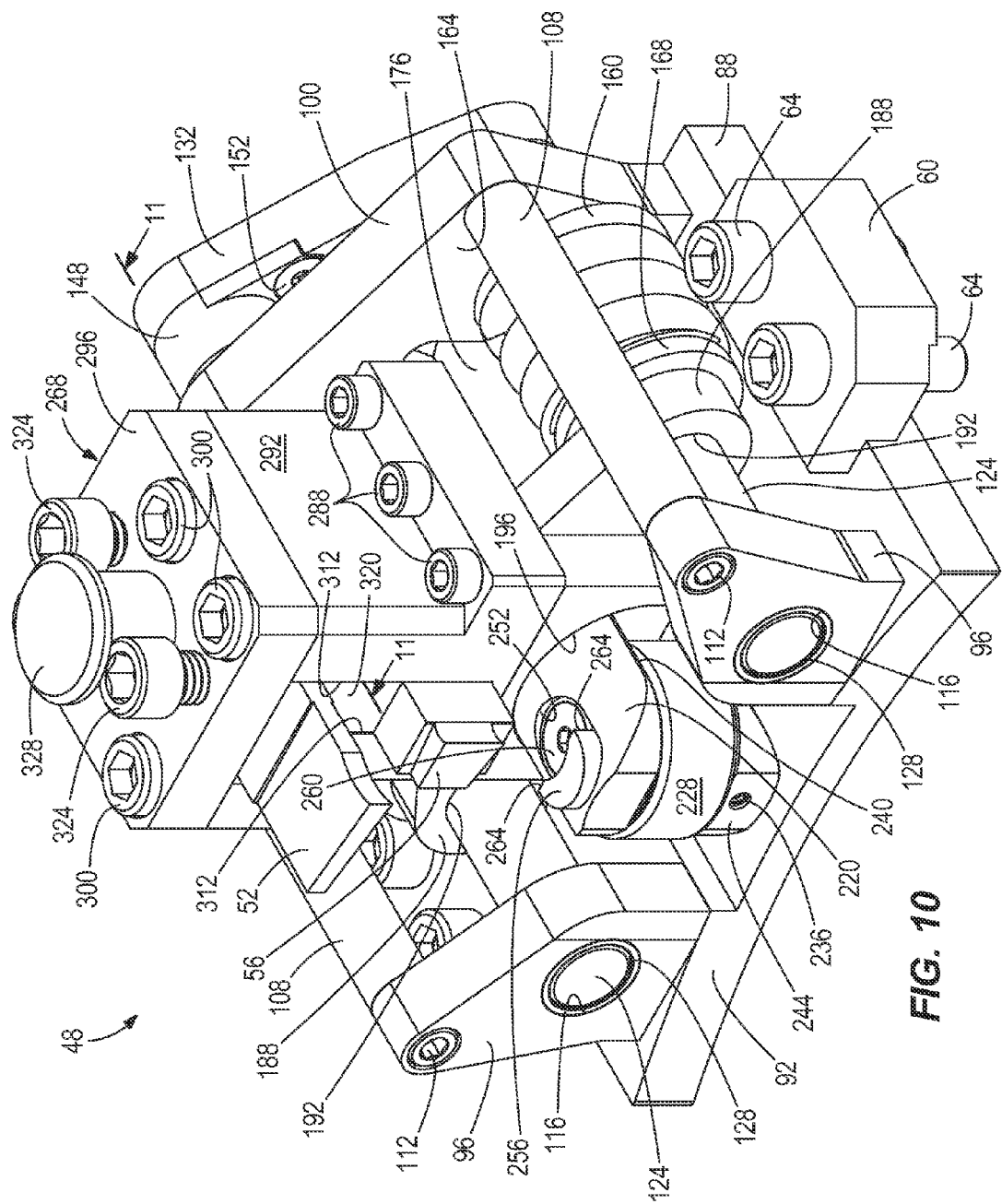
FIG. 10 is an isometric view of the tool support of the pipe machining apparatus illustrated in FIG. 1 with the tool support shown in a retracted or set-up position, in accordance with one embodiment.
Figure 11:
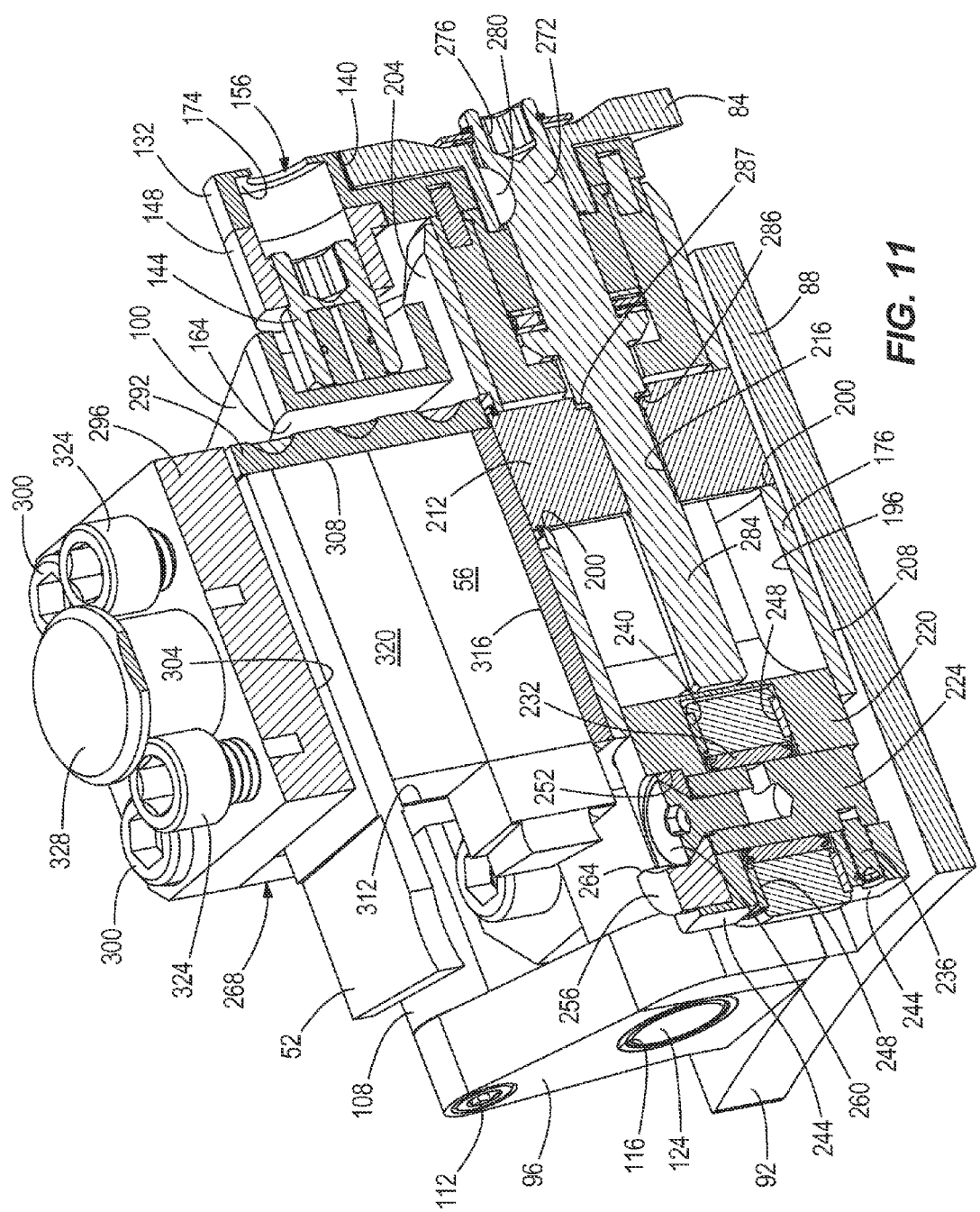
FIG. 11 is a cross-sectional view taken along line 11-11 in FIG. 10, in accordance with one embodiment.

To initially setup the tool support 48 in preparation of machining a pipe 22, the tool housing 268, the tools 52, 56, the roller housing 176, and the roller 228 need to be retracted or moved outward to be clear from the pipe 22 to which the apparatus 20 is coupled. With reference to FIGS. 10 and 11, the tool support 48 is shown in a retracted or set up position. As can be seen, the roller 228 and roller support member 220 are retracted away from engagement with a pipe 22, the roller housing 176 is retracted away from the stop member 256, and the tool housing 268 and tools 52, 56 are retracted well away from interference with the pipe 22. The biasing members 160 are in their most compressed condition between the outer support member 100 and the flanges 188 of the roller housing 176.

Once the apparatus 20 is coupled to a pipe 22, it is desirable to bring the roller 228 into engagement with the pipe 22. This is accomplished by engaging the threaded fastener 144 with an appropriate tool, rotating the threaded fastener 144, which causes the threaded member 148, the plate 132, the guide members 124, the roller support member 220, and the roller 228 to move inward toward a pipe 22. The threaded fastener 144 is rotated until the roller 228 engages an exterior surface of the pipe 22. As the above referenced components are moved inward toward the pipe 22, the tool housing 268, the tools 52, 56, and the roller housing 176 remain in their retracted position. The roller 228 and associated components are adapted to track an exterior surface of the pipe 22 to properly position the tools 52, 56 relative to the pipe 22. In some instances, the pipe 22 may not have a perfectly circular or round periphery. The roller 228 and associated components accommodate the non-circular shaped of the pipe 22 and ensure proper parting of the pipe 22 and machining of the groove 23.

Figure 4:
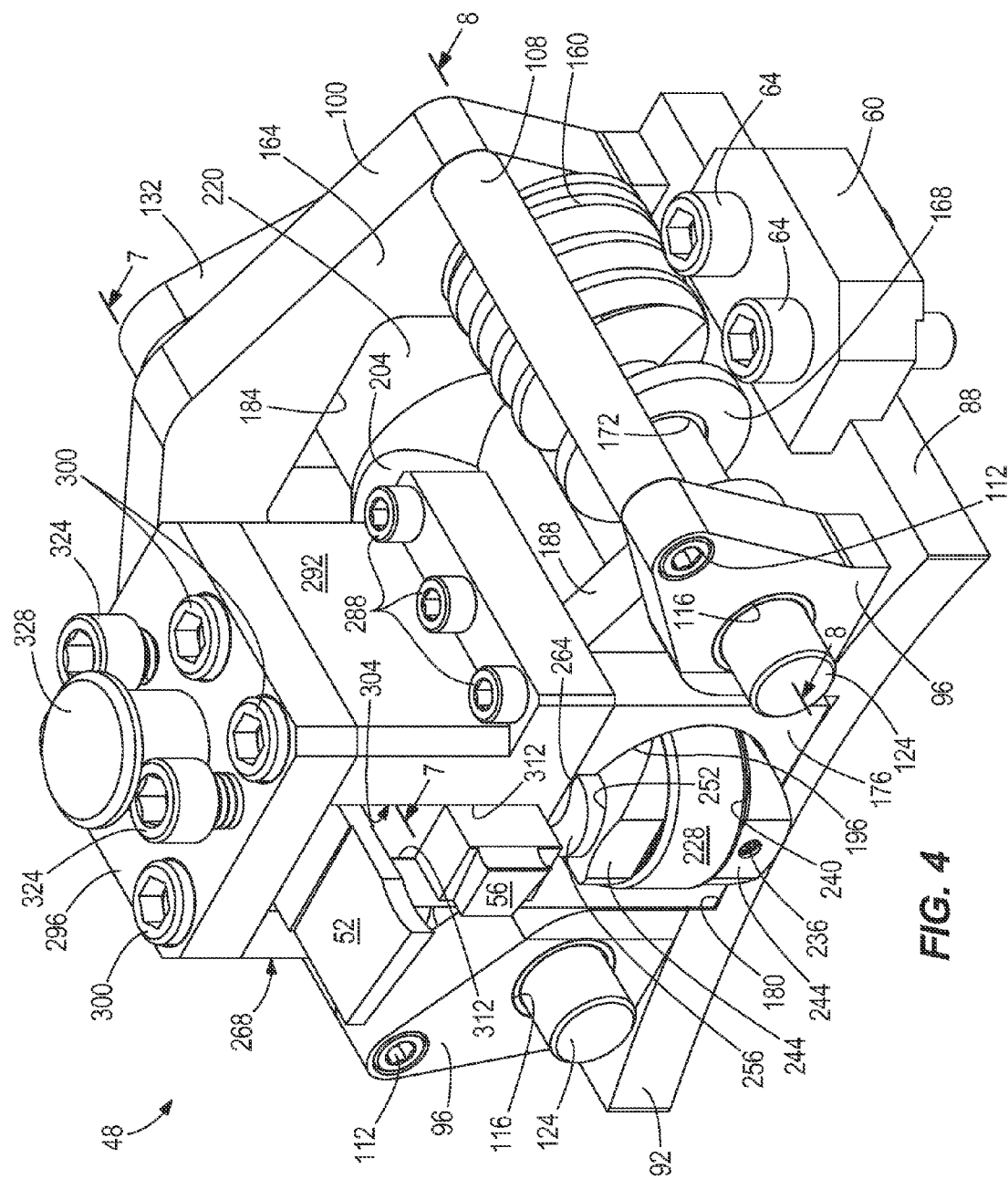
FIG. 4 is an isometric view of an exemplary tool support of the pipe machining apparatus illustrated in FIG. 1 with the tool support shown in a forward or advanced position, in accordance with one embodiment.
Figure 5:
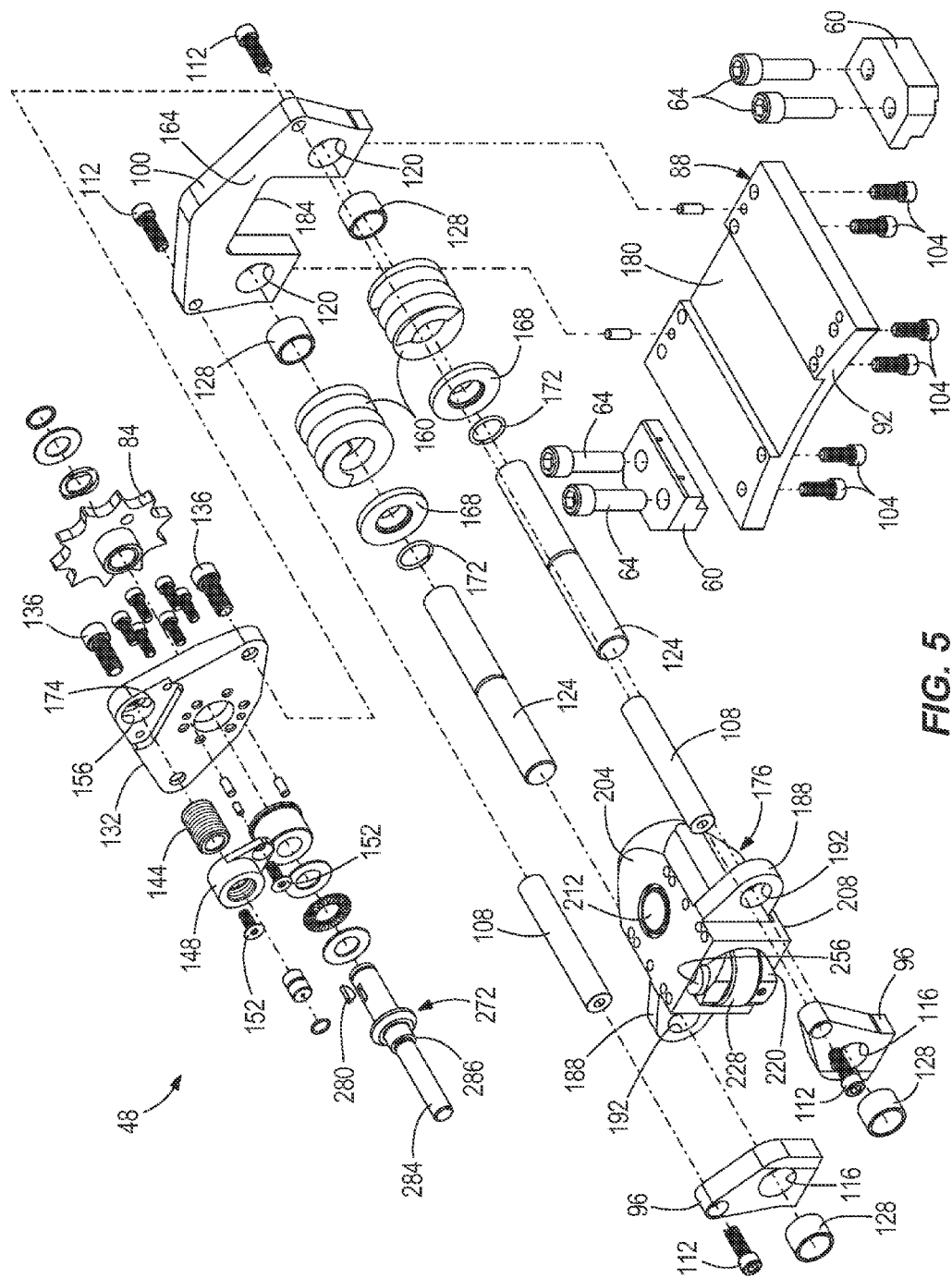
FIG. 5 is an exploded view of the tool support illustrated in FIG. 4, in accordance with one embodiment.
Figure 6:
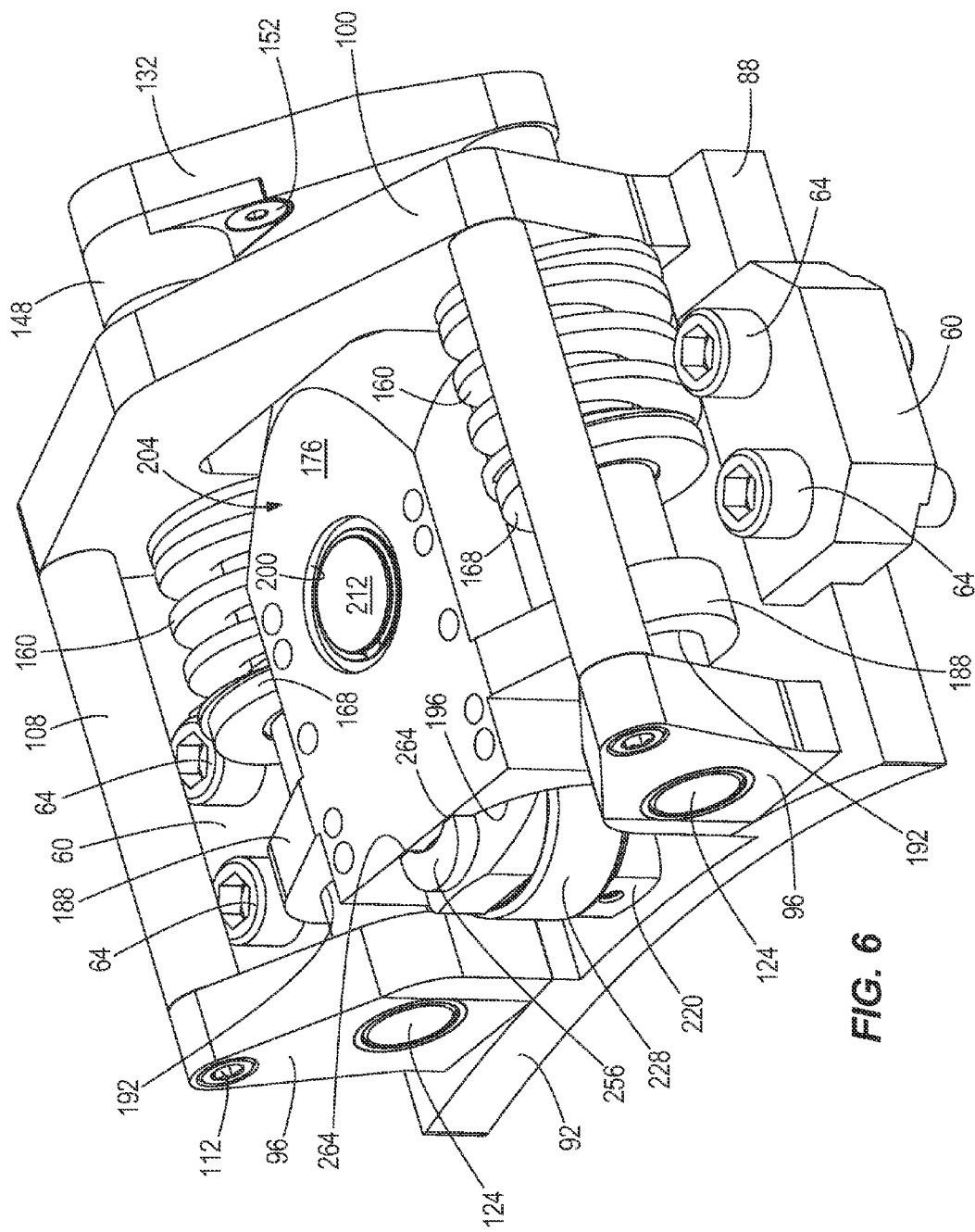
FIG. 6 is an isometric view of a portion of the tool support illustrated in FIG. 4, in accordance with one embodiment.
Figure 7:
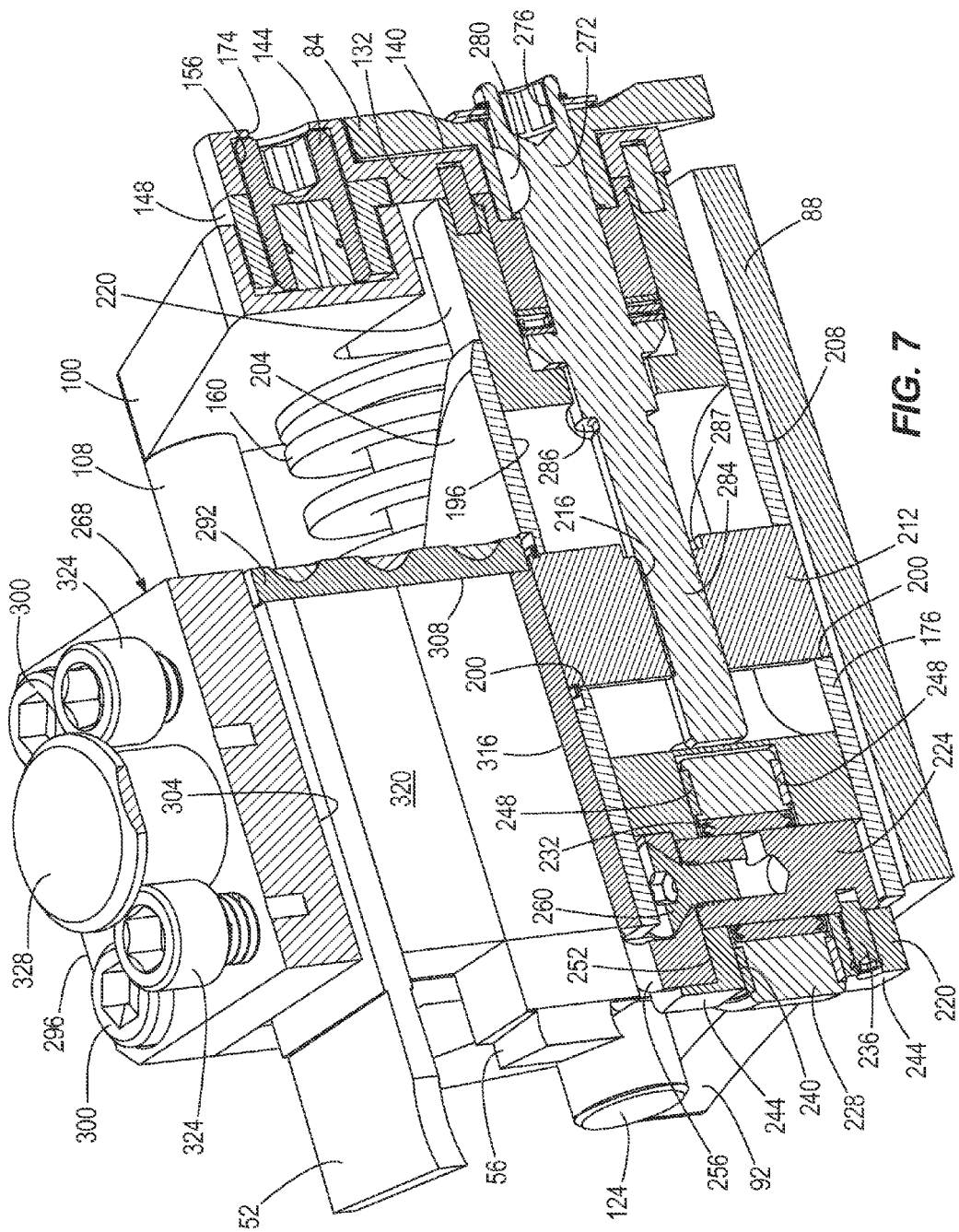
FIG. 7 is a cross-sectional view taken along line 7-7 in FIG. 4, in accordance with one embodiment.
Figure 8:
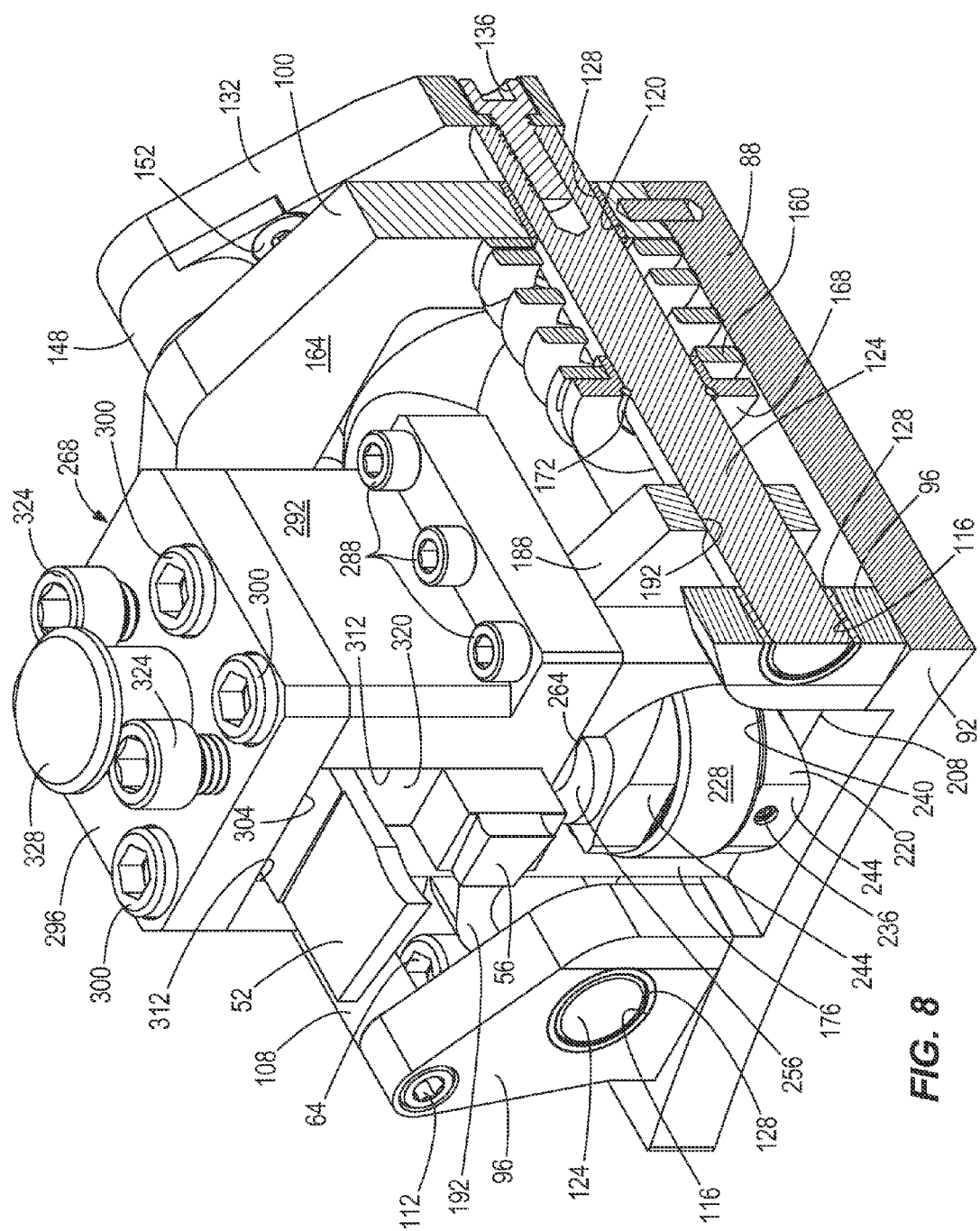
FIG. 8 is a cross-sectional view taken along line 8-8 in FIG. 4, in accordance with one embodiment.

Once the roller 228 engages the pipe 22, the machining operation of the pipe 22 may initiate. The motor drives the tool carrier 32 and tool support 48 around relative to the frame 28 and the pipe 22. As the tool support 48 rotates, the advancement member 84 will come into engagement with the advancement mechanism 80. Upon engagement, the advancement member 84 rotates, thereby causing the advancement shaft 272 to rotate and translate the coupling member 212, the roller housing 176, the tool housing 268, and the tools 52, 56 inward toward the pipe 22. Since the parting tool 52 extends inward a greater extent than the groove tool 56, the parting tool 52 will engage the pipe 22 first and begin machining or parting the pipe 22 before the groove tool 56 begins to machine the groove 23 into the pipe 22. As advancement progresses, the groove tool 56 will eventually contact the pipe 22 and begin machining the groove 23 into the pipe 22. Machining continues until the roller housing 176 engages the stop member 256. This position of the tool support 48 is illustrated in FIGS. 1, 2, and 4. At this point, machining of the groove 23 is completed and the groove 23 has the desired size, shape, depth, width, position relative to the cut end of the pipe 22, etc. In some instances, the pipe 22 may be completely parted before the groove 23 is completed. In such instances, the apparatus 20 will continue to operate, even after the pipe 22 is completely parted, until the groove 23 is completed. In other instances, the pipe parting and groove machining may be completed substantially simultaneously. After completion of the machining process, the tools 52, 56, tool housing 268, etc., are retracted to move them clear of the pipe 22.

With reference again to FIGS. 1 and 2, the apparatus 20 provides a low radial clearance relative to other pipe machining apparatuses. In other words, the apparatus 20 does not project outwardly from the pipe 22 a significant distance. This is beneficial because pipes are often located in densely packed environments, which provide little spacing between pipes and other objects in the environment. The tool support 48 is the component of the apparatus 20 that projects the furthest. In the illustrated exemplary embodiment, the tool support 48 only projects about 5.2 inches from a periphery of a pipe 22. In other exemplary embodiments, the tool support 48 projects between about two inches and about twelve inches from a periphery of the pipe 22.

As can be seen, the apparatus 20 includes a variety of fasteners to fasten a variety of components together. In some exemplary embodiments, it should be understood that all the fasteners may be manipulated with the same size tool (e.g., a wrench).

It should also be understood that the apparatus 20 provides an easy and accurate manner of parting a pipe and machining a groove 23 into the pipe with little to no set up, measuring with gauges, positioning of the tools 52, 56, etc. Rather, the apparatus 20 is merely coupled to the pipe 22 and operated to rotate the tool carrier 32, tool support 48, and tools 52, 56 relative to the pipe 22. The tools 52, 56 are configured to perform the desired machining and the tool support 48 is adapted to stop the machining operation at the appropriate time to provide the desired parting cut and desired groove 23, thereby inhibiting potential human or machine error.

It should be understood that the use of any orientation or directional terms herein such as, for example, "top", "bottom", "front", "rear", "back", "left", "right", "side", "inner", "outer", "inward", "outward", etc., is not intended to imply only a single orientation of the item with which it is associated or to limit the present disclosure in any manner. The use of such orientation or directional terms is intended to assist with the understanding of principles disclosed herein and to correspond to the exemplary orientation illustrated in the drawings. For example, the pipe machining apparatus may be utilized in any orientation and use of such terms is intended to correspond to the exemplary orientation of the pipe machining apparatus illustrated in the drawings. The use of these terms in association with the pipe machining apparatus is not intended to limit the pipe machining apparatus to a single orientation or to limit the pipe machining apparatus in any manner.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While various embodiments of the disclosure have been described, it will be apparent to those of ordinary skill in the art that other embodiments and implementations are possible within the scope of the disclosure. Accordingly, the disclosure is not to be restricted.

The invention claimed is:

1. A tool support for a pipe machining apparatus, the tool support comprising:
   a base;
   an advancement member adapted to rotate;
   an advancement shaft coupled to the advancement member and adapted to rotate with the advancement member, wherein the advancement shaft includes a threaded portion;

a roller housing threadably coupled to the threaded portion of the advancement shaft and moveable along the advancement shaft as the advancement shaft rotates;

a tool housing coupled to and moveable with the roller housing, wherein the tool housing is adapted to simultaneously support a parting tool and a groove tool;

a roller adapted to engage an exterior surface of a pipe; and a stop member engageable by the roller housing and adapted to stop movement of the parting tool and the groove tool in one direction with the parting tool and the groove tool supported by the tool housing.

2. The tool support of claim 1, wherein the groove tool is one of a plurality of groove tools adapted to be interchangeably supported, one at a time, by the tool support, and wherein each of the plurality of groove tools is adapted to machine a uniquely configured groove in a pipe.

3. The tool support of claim 2, wherein the parting tool is adapted to be used in combination with any of the plurality of groove tools.

4. The tool support of claim 1, wherein the stop member is adapted to stop movement of the parting tool and the groove tool in a direction toward the pipe.

5. A tool support for a pipe machining apparatus, the tool support comprising:

a base;

an advancement member adapted to rotate;

an advancement shaft coupled to the advancement member and adapted to rotate with the advancement member, wherein the advancement shaft includes a threaded portion;

a roller housing threadably coupled to the threaded portion of the advancement shaft and moveable along the advancement shaft as the advancement shaft rotates;

a tool housing coupled to and moveable with the roller housing, wherein the tool housing is adapted to support a parting tool and a groove tool;

a roller adapted to engage an exterior surface of a pipe;

a stop member engageable by the roller housing and adapted to stop movement of the parting tool and the groove tool in one direction with the parting tool and the groove tool supported by the tool housing; and a roller support member to which the roller is coupled, wherein the roller support member and the roller are moveable relative to the base, the roller housing, and the tool housing.

6. The tool support of claim 5, further comprising a threaded fastener coupled to the roller support member, wherein rotation of the threaded fastener moves the roller support member.

7. The tool support of claim 5, wherein the groove tool is one of a plurality of groove tools adapted to be interchangeably supported, one at a time, by the tool support, and wherein each of the plurality of groove tools is adapted to machine a uniquely configured groove in a pipe.

8. The tool support of claim 7, wherein the parting tool is adapted to be used in combination with any of the plurality of groove tools.

9. The tool support of claim 5, wherein the stop member is adapted to stop movement of the parting tool and the groove tool in a direction toward the pipe.

* * * * *